United States Patent [19]
Huston, Sr. et al.

[11] Patent Number: 5,213,867
[45] Date of Patent: May 25, 1993

[54] TETRAHEDRAL LOOSE-FILL PACKING

[76] Inventors: Henry H. Huston, Sr., 131 Main St.; Henry H. Huston, Jr., 6 Mountview Ct.; Peter T. Bennett, 50 Hillcrest Rd., all of Burlington, Vt. 05401

[21] Appl. No.: 799,035

[22] Filed: Nov. 26, 1991

Related U.S. Application Data

[63] Continuation-in-part of Ser. No. 633,214, Dec. 21, 1990, abandoned.

[51] Int. Cl.⁵ ............... B32B 1/00; B65D 85/30
[52] U.S. Cl. .................... 428/126; 428/34.3; 206/584; 206/814; 493/967
[58] Field of Search ............... 428/34.2, 98, 126, 34.3; 206/584, 814; 220/429; 493/967; 229/116

[56] References Cited

U.S. PATENT DOCUMENTS

| | | | |
|---|---|---|---|
| 2,341,056 | 2/1944 | Moore | 229/116 |
| 2,741,079 | 4/1956 | Rausing | 229/116 |
| 3,038,649 | 6/1962 | Rausing | 229/17 |
| 4,880,214 | 11/1989 | Sukai | 267/136 |

Primary Examiner—Alexander S. Thomas
Attorney, Agent, or Firm—Brooks Haidt Haffner & Delahunty

[57] ABSTRACT

The use of hollow tetrahedral units as cushioning loose-fill is described. The loose-fill tetrahedra can be made from recycled material such as paper waste by the method of the invention. The loose-fill tetrahedra do not fill the entire space surrounding a packed article, but do support each other during shipping and handling. Apparatus for forming the tetrahedra is described.

7 Claims, 5 Drawing Sheets

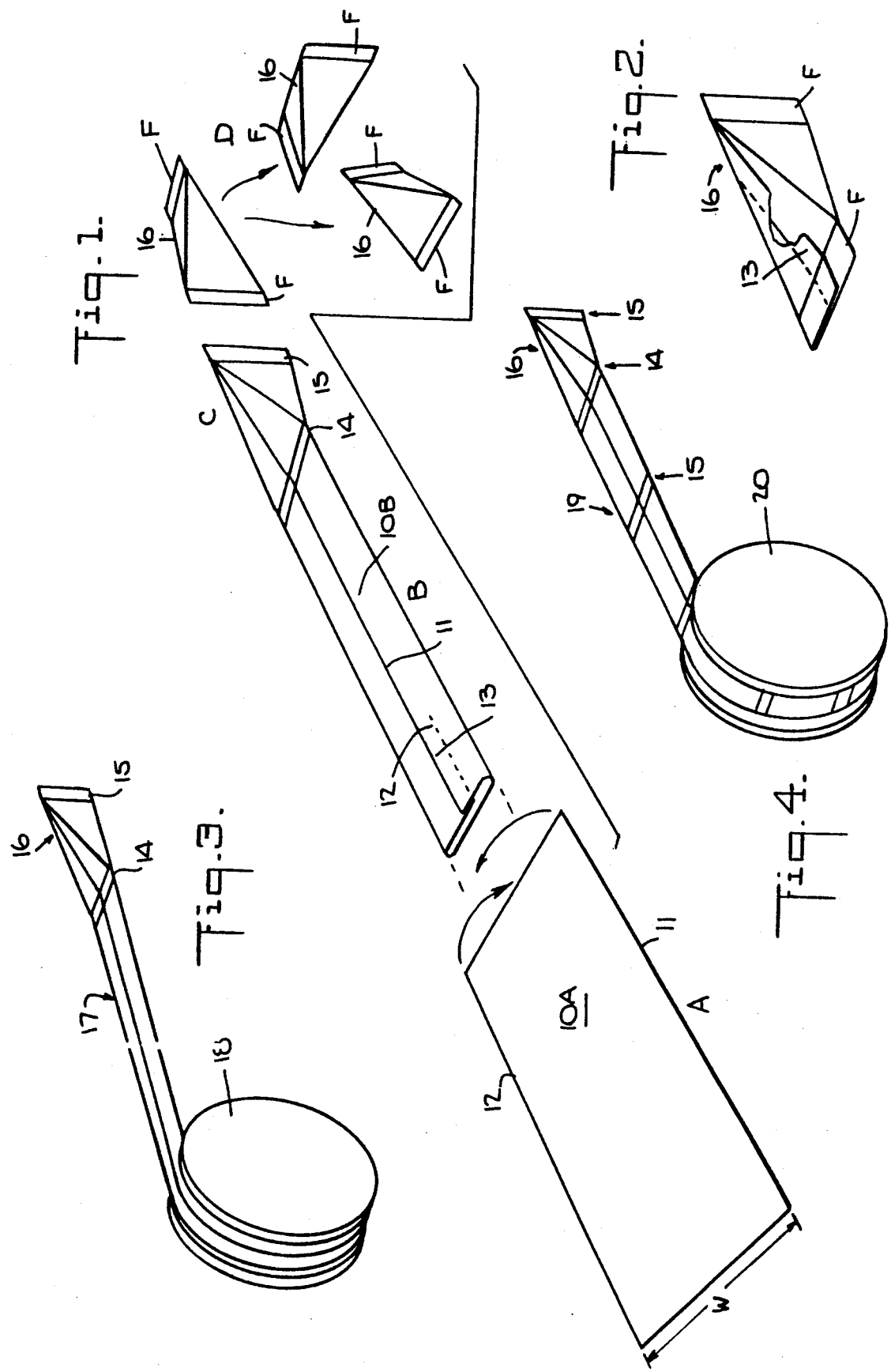

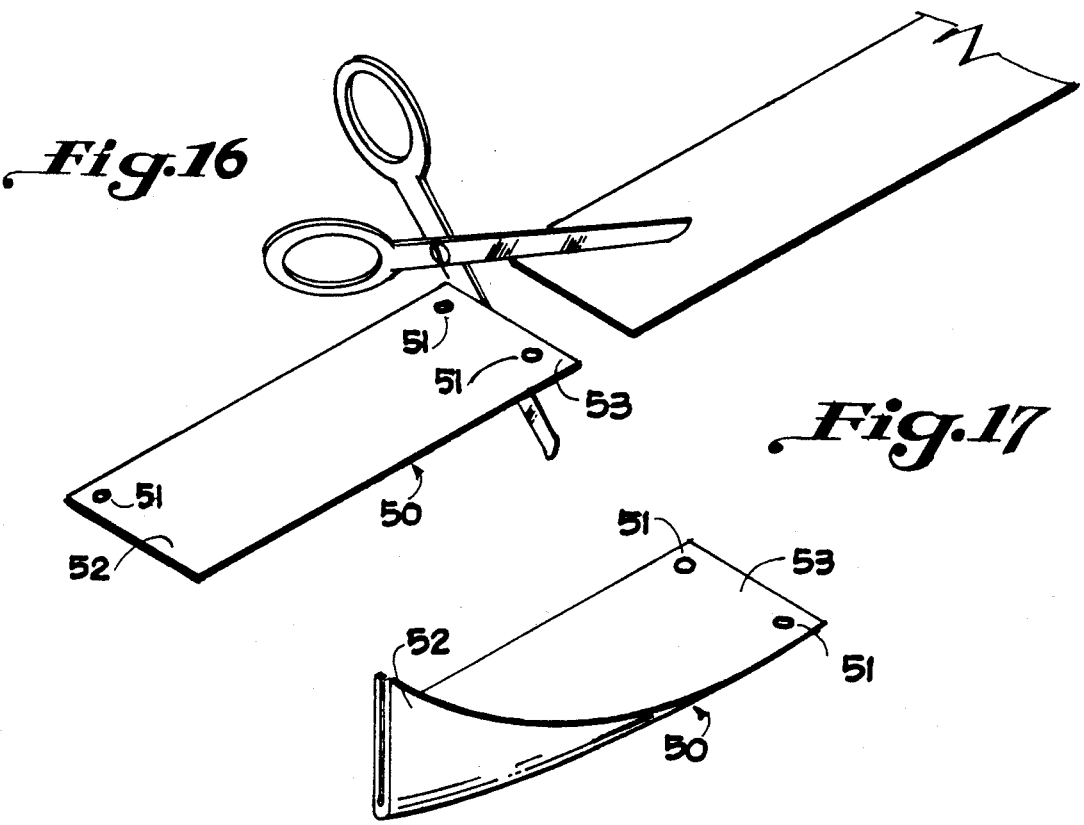
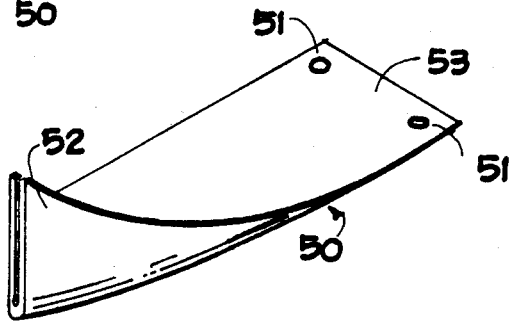
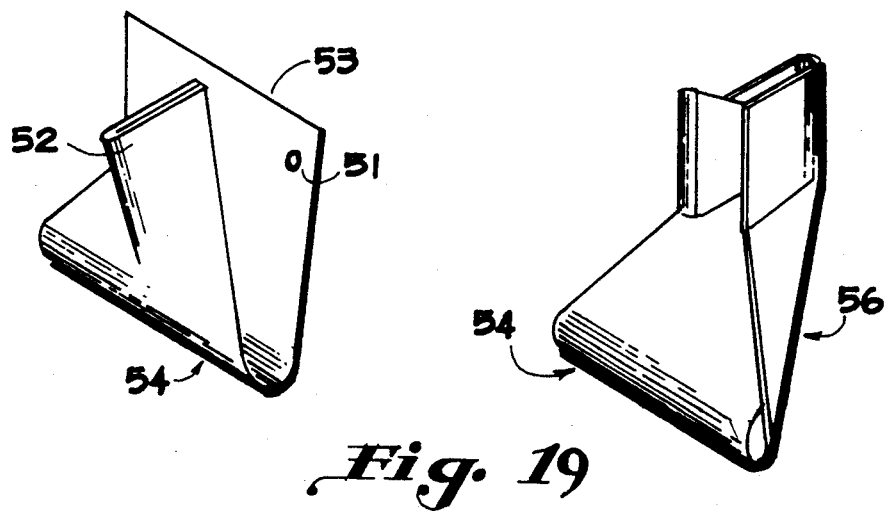

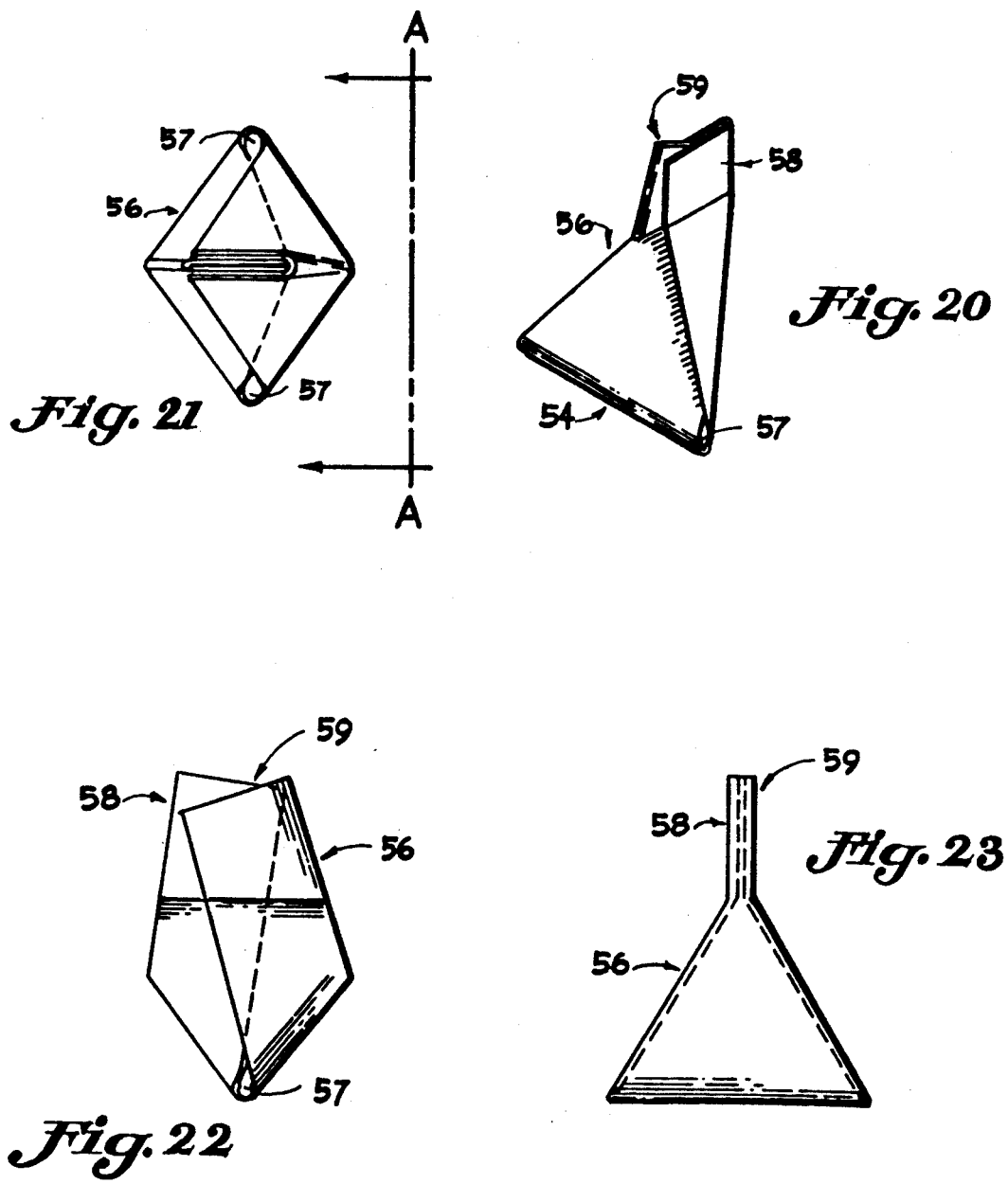

TETRAHEDRAL LOOSE-FILL PACKING

CROSS REFERENCE TO RELATED APPLICATION

This application is a continuation-in-part of application Ser. No. 633,214 filed Dec. 21, 1990, now abandoned, and having the same title.

BACKGROUND OF THE INVENTION

Field of the Invention

The present invention relates to loose-fill packing and to a method for manufacturing such packing. Packing in the form of hollow tetrahedra and the making of such tetrahedra are described.

Description of Related Art

The term loose-fill describes the various kinds of cushioning material used by shippers of goods to protect merchandise during shipment. Well suited to protecting a wide variety of objects, such as items shipped in corrugated box containers, loose-fill has the advantages of being easy to insert into a package, filling any size or shape cavity, and being relatively inexpensive. Some desirable properties for loose-fill packing material are low density, ability to spring back after being compressed (resiliency), ability to absorb shock (related to stiffness) and the ability to fill a void of any shape, as well as ease of insertion into a package ("pour-ability").

Products currently sold as and/or used as substitutes for loose-fill material are pellets of expanded polystyrene ("EPS") foam (often in the shape of, and therefore called, EPS "peanuts"), shredded newspaper, and crimped paper of one sort or another. Recently efforts have been made to form waste paper into peanut shapes by use of a wet molding process.

It is believed that the most common loose-fill material is made from expanded polystyrene. Many millions of pounds of EPS loose-fill are produced and used each year. One driving force behind the growing use of EPS loose-fill is the catalog mail-order industry.

There are environmental concerns about the use of EPS loose-fill. Chlorofluorocarbons used in the manufacture of EPS and gradually released into the atmosphere by the expanded material are harmful to the Earth's ozone layer. EPS loose-fill is not ordinarily recycled by those who receive packages containing it, and EPS is not readily bio-degradable when disposed of as waste.

The purpose of the present invention is to provide a substitute for EPS loose-fill which is non-polluting, biodegradable and inexpensive, and which can be made from recycled materials.

U.S. Pat. No. 3,606,726 describes sausage-like dunnage links which can be made with waste material, such as waste paper. U.S. Pat. No. 4,247,289 shows paper folded into a flat tube, which is bent into zig-zag shape to form a paper "spring". Such springs are said to be useful as cushioning material in shipping.

There are a number of U.S. patents relating to containers that are tetrahedral in shape. U.S. Pat. Nos. 3,038,649 and 3,032,251 show laminated sheet material formed into packages in the general shape of regular tetrahedra, i.e. orthogonal tetrahedra with four faces shaped as identical equilateral triangles. Such regular tetrahedra cannot be packed together closely to fill a volume completely.

The fact that regular tetrahedral packages cannot be closely packed is noted in U.S. Pat. No. 3,347,363 which proposes the use of irregular tetrahedral containers wherein each of the four package faces is shaped as a right triangle for compact nesting within the confines of a rectangular prism. Other packages of irregular, elongated tetrahedral form are shown in U.S. Pat. Nos. 3,244,274 and 3,250,386.

Apparatus for manufacturing tetrahedral packages is shown in U.S. Pat. No. 2,741,079, and a machine for making tubular elements is shown in U.S. Pat. No. 4,308,023.

Although tetrahedral containers, for liquids or other free-flowing products, especially food products, have been made of materials such as laminated paper, the advantages of the use of empty tetrahedral units, which can be formed of recycled material, as loose-fill packing, and which need not be sealed against the escape of contents, have not been recognized.

SUMMARY OF THE INVENTION

The present invention relates to the production and use of hollow, empty tetrahedra, formed from flat stock flexible enough to allow rolling and forming into loose-fill tetrahedra. By the terms hollow and empty it is meant that the tetrahedral units contain nothing but air. In a presently preferred form of the invention, the tetrahedra are formed by using re-cycled magazine pages as the flat feed stock, which is an environmentally attractive use of recycled material. When the tetrahedra of the invention are made from waste magazine pages, the loose fill can be readily recycled, is biodegradable and non-polluting.

Other stock materials, such as thin metal, plastic sheet or paper in a range of weights can also be employed, depending upon the desired application. By varying the materials from which the tetrahedra are made, and/or the dimensions of the tetrahedra, it is possible to select the stiffness of the loose-fill under a compressive load to adapt to different cushioning requirements.

For most applications, it is desirable to use tetrahedra of a size small enough to fill small spaces around an object to be protected during shipment.

The great advantage of the tetrahedral shape is its inherent structural strength. As noted above, regular, orthogonal tetrahedra with all faces equilateral triangles cannot so nest together as to completely fill a volume of space. Special tetrahedral forms can be produced which are capable of filling a volume completely with no spaces between the tetrahedral units, but the present invention relates to loose-fill, where such tight nesting is not desired. When tetrahedra which will not closely interfit to fill completely the volume defined within a right rectangular prism are employed as cushioning packaging material, the density and hence the weight of the packing material is lower than would be the case with tetrahedron units shaped to fill the volume of a container such as a shipping carton completely. Such non-nesting tetrahedra do not settle during shipping and handling into a compact volume, leaving empty space around an object to be protected during shipment, but because of their shape, tend to support each other against impacts and pressure. Each individual tetrahedron, because of its shape and because of the inherent stiffness of its constituent material, is self-supporting, that is, each tetrahedron is resistant to deformation under pressure, and tends to return to its original shape if it is deformed.

It will be understood that close nesting, which is desirable when tetrahedral containers, filled with some product, are to be packed and shipped, is not the goal when empty, hollow tetrahedron units are to be employed as loose-fill.

The tetrahedral loose-fill of the invention can be formed by rolling flat material into a tube with an overlapping longitudinal seam, and typically fastening the seam with an adhesive. The flat tube so formed is then cut into sections of uniform length and the two opposite ends of each section are crimped and folded at an angle of ninety degrees to one another. This results in a tetrahedral configuration with the previously flat material now enclosing an empty space.

A variation of the basic process just described would be to provide pre-rolled flattened tube stock to a user who can then cut the flat tube stock and form tetrahedra to meet packing requirements.

A simpler alternative method for forming tetrahedra according to the invention has the steps of: cutting strip material to the desired length; pinching together one end of the cut strip; folding back the other end of the cut strip and pinching together the other end outside the first pinched-together end. The resulting superposed end portions can then be crimped or otherwise secured together.

Loose-fill according to the invention is substantially less expensive than EPS loose-fill. It can be made from secondary materials which can be recovered from the solid waste stream, such as magazine pages or the like. No harmful chemical products and minimal energy are needed to make the loose-fill tetrahedra, and the loose-fill is recyclable and biodegradable.

The applications and advantages of the tetrahedral loose-fill of the invention and methods and apparatus for the manufacture of tetrahedral loose-fill will be more fully understood when the following detailed description is read in view of the several accompanying figures of drawing.

BRIEF DESCRIPTION OF THE DRAWINGS

In the accompanying drawing figures in which like reference characters indicate like parts throughout:

FIG. 1 schematically illustrates the process of making tetrahedral loose-fill in accordance with the invention.

FIG. 2 shows a single loose-fill tetrahedron with a portion broken away to illustrate a seam.

FIG. 3 shows how prepared flattened tubular stock can be employed by a packaging material user to make tetrahedra according to the invention at a packaging facility.

FIG. 4 shows another form of flattened tubular stock with pre-formed areas for separation into individual tetrahedra.

FIGS. 16-19 illustrate an alternative method for forming tetrahedral loose fill packing material units according to the invention.

FIG. 20 is a perspective view of a tetrahedral unit formed according to the method of claims 16-19.

FIG. 21 is a top view of the unit of FIG. 20 in which dashed lines indicate hidden edges.

FIG. 22 is a side view of the tetrahedron unit of FIG. 20 with dashed lines showing hidden edges.

FIG. 23 is a front view of the loose fill packing unit of FIG. 20 taken along line A—A of FIG. 20 and looking in the direction of the arrows, wherein dashed lines indicate concealed edges.

DETAILED DESCRIPTION OF PREFERRED EMBODIMENTS

Figure 5:
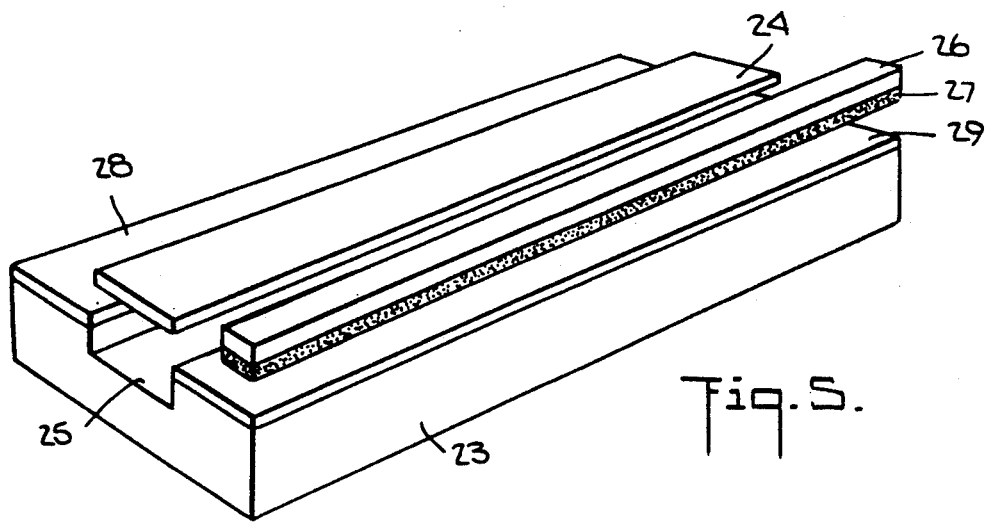
FIGS. 5-11 are simplified illustrations of the steps of forming a flattened tube.

Drawing FIG. 1 illustrates the method of forming tetrahedra for use as loose-fill according to the invention. A sheet 10A of flat stock, which can be of waste or virgin paper of a selected width is seen at step A in the lower left in the figure. The arrows indicate the folding up and over of the edges 11, 12 of the web to form a flat tube 10B. The combined width of the two edge portions 11 and 12 is between one half and two thirds of the total width W of the sheet 10A, so that after folding as shown the edge portions 11 and 12 are in an overlapping relationship as shown at step B in the middle of the sheet of drawing. One or both of the edge portions 11 and 12 can be treated with an adhesive prior to the folding step so that the edge portions 11 and 12 adhere to each other at their area of overlap or seam 13.

At step C of FIG. 1 longitudinally spaced transverse strips 14 and 15 of the tube 10B are crimped together, the strip 14 being disposed at an angle of 90 degrees to the strip 15 as shown. A transverse cut is then made through the strip 14 and the tetrahedron 16 is produced as shown at step D in FIG. 1. The crimped and cut areas form end flaps F disposed at an angle of 90 degrees with respect to each other as shown in FIG. 2.

The steps of crimping together transverse strips, each strip being disposed at an angle of ninety degrees with respect to any adjacent crimped strip, and then cutting across the material at the middle of the strips to form the flaps is repeated until the flat tube stock 10B is used up.

There is no need for the crimped areas 14 and 15 to form a tight seal since the tetrahedron 16 is not for use as a container, so there will be no contents except air. Leakage is not a problem. If desired, the areas at 14 and 15 can be secured as by mechanical interlocking of the sheet material or by use of a suitable adhesive. In one preferred embodiment of the invention the free edge of each end flap F is bent at an angle to the flap to form a tab which mechanically secures the flap ends of the tetrahedron. The dimensions of the flaps and the way in which the flaps are joined will affect the stiffness and cushioning ability of the tetrahedra and can be chosen according to cushioning requirements.

A single tetrahedron 16 according to the invention is shown in FIG. 2. The overlapping seam 13 at which the edges 11 and 12 of the originally flat sheet 10 are joined is defined by dashed and solid lines in FIG. 2.

FIG. 3 shows one form in which pre-folded and seamed stock 17 can be provided to a packager or other user for forming into the tetrahedra 16 of the invention. As shown in FIG. 3, such stock 17 can be conveniently wound on a roll 18 for shipment and ease of use.

The pre-folded and seamed stock 19 of FIG. 4 is similar to that of FIG. 3, but in addition has indicia at the areas 14 and 15 where the stock is to be severed to form the individual tetrahedra 16 with their end flaps F. There may be score lines, perforations, or other weakened transverse lines at the crimped areas 14 and 15 for ease of separation by the user when the stock 19 is formed into the tetrahedra 16. The stock 19 is shown wound on a roll 20 for easy shipping, handling and use.

There are few limitations on the size of the tetrahedra 16 of the invention. A tetrahedron product comparable to the EPS peanuts presently available can have a length of about 1⅜" and can be formed from a flattened tube about 1" wide with a ¼" seam overlap. The flat stock 10 from which such a tetrahedron is made is about 2¼" wide and is cut transversely into the 1⅜" lengths. Tetrahedra of the foregoing dimensions do not nest so closely together as to completely fill a volume, but do support each other when used as loose-fill.

In keeping with the intent of the invention to provide an environmentally acceptable packing material, it is desirable that the primary material source be a segment of the waste stream which is difficult to bio-degrade, and for which no stable secondary markets exist. Such a material is magazine paper stock. Such waste magazine page stock is converted in accordance with the invention into a secondary product that has a markedly reduced density from the original flat paper stock and is thus more readily bio-degradable in current land fill practice.

In contrast to the present invention polystyrene is first manufactured as a resin, which is then expanded (foamed) by introducing a gas such as "Freon" into the resin to be entrapped in the resin foam. Expanded foam pellets, e.g. peanuts, are shipped to the user for warehousing until the pellets are utilized as loose-fill in shipping containers.

Tetrahedral loose-fill of the present invention can be made at the facilities of the loose-fill users, who need simply to store old magazines at their premises in their high density form until it is desired to convert the paper into packing material. After conversion into tetrahedra, the volume of each magazine has increased about 27-fold. This results in significantly reduced transportation and storage costs as compared with EPS loose-fill.

The method of forming a flat tube according to the invention is illustrated in FIGS. 5-11, along with basic machine elements used to form such a tube from which the tetrahedra of the invention can be made.

Starting with the presently preferred material of the invention, used or other waste magazines, conventional paper cutting equipment is employed to remove the magazine spine. The loose sheets thus produced are trimmed, if necessary, to rectangles about 7.5" by 9.75" in size. These sheets are cut lengthwise into three strips approximately 9.75 inches long by 2 ½ inches wide. Each such strip is used as the flat blank for the tube stock from which six tetrahedra will be subsequently formed.

If it is desired to provide tube stock of a length greater than 11 inches, for use, for example in the rolls of preformed stock of FIGS. 3 and 4, a continuous web of sheet material may be cut longitudinally into strips, or alternatively, separate pieces of waste paper can be secured end to end to provide longer strips.

The flat blanks 10 are fed individually to overlie a machine body 23. The upper face of the body 23 has a longitudinal rectangular channel 25 formed therein which is somewhat wider than the width of a mandrel 24, all as shown in FIG. 5.

Figure 6:
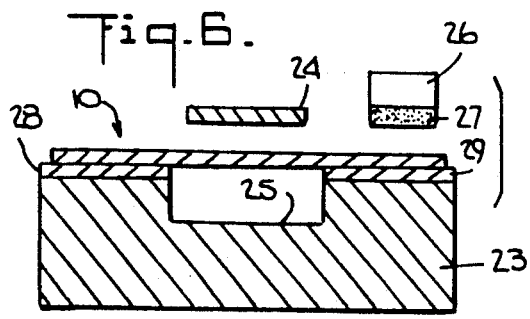

The mandrel 24 is movable into and out from the channel 25. FIG. 6 shows the flat stock strip 10 in place above the machine body 23. Forming blades 28 and 29 are shown disposed along opposite sides of the channel 25, between the flat stock strip 10 and the upper face of the machine body 23, and the elongated flat mandrel 24, which is shown as of a flat generally rectangular shape in the drawings. An adhesive applicator 26 which is reciprocably movable with respect to the machine body 23 carries an adhesive applying strip 27 facing the machine body.

Figure 7:
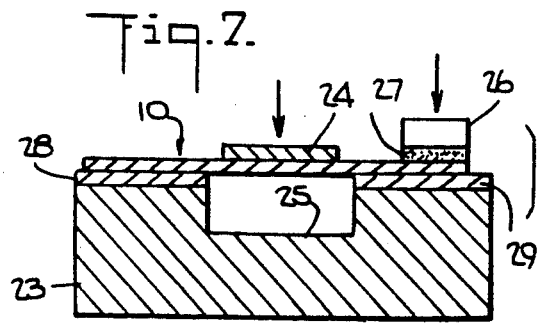

At the next stage of the tube forming process, illustrated in FIG. 7, the mandrel 24 and the adhesive applicator 26 are moved toward the machine body 23, and the adhesive applying strip 27 contacts the upper face of the blank 10 as shown, applying suitable adhesive along one longitudinal edge of the flat block 10. This can be the edge portion 13 of FIG. 1.

Figure 8:
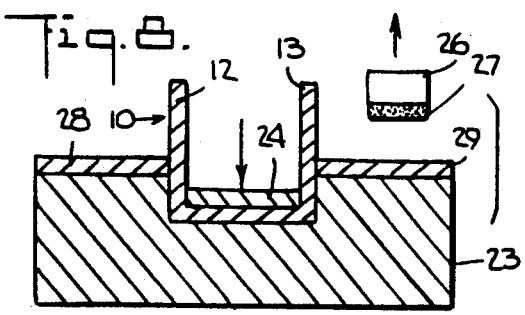

The adhesive applicator 26 is then moved away from the blank 10 and the machine body 23 as shown in FIG. 8. The mandrel 24 presses the central portion of the blank 10 into the recess 25, which causes both edges 12 and 13 to assume orientations generally normal or perpendicular to the web portion of the blank 10 which has been pressed into the channel 25 as shown in FIG. 8.

Figure 9:
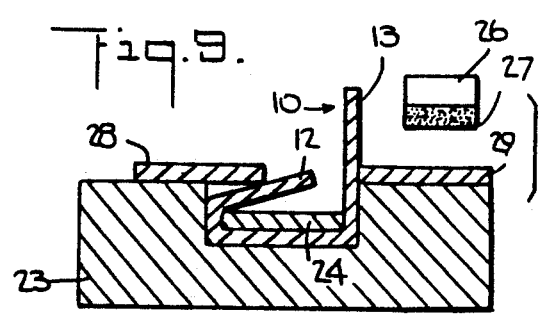
Figure 10:
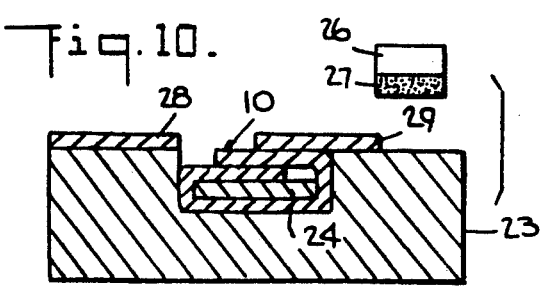

In the next step of the flat tube forming process, the forming blade 28 is moved across the face of the machine body 23 to overlie at least part of the channel 25 forcing the edge 12 of the blank 10 to fold over the mandrel 24 as shown in FIG. 9. Then as shown in FIG. 10 the blade 28 is withdrawn to its position alongside the channel 25 and the other forming blade 29 is moved across the face of the machine body to overlie at least part of the width of the channel 25. This motion of the blade 29 folds the edge 13 of the blank strip 10, to overlie the other strip edge 12. The adhesive on the edge 13 secures the edges 12 and 13 together.

Figure 11:
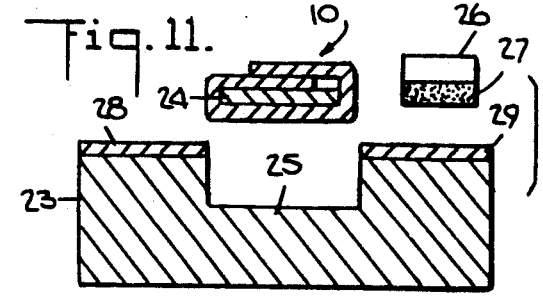

The blade 29 is then retracted and the mandrel 24, surrounded by and carrying the flat tube formed of the blank 10, is moved away from the machine body 10 and out of the channel 25 as shown in FIG. 11.

When a mandrel having dimensions of about ¼" by 1" by 11" is used as the mandrel 24, the flat tube formed by the process shown in FIGS. 5-11 will be suitable for use in making the tetrahedra of the invention.

The flattened tube stock can then be either formed directly into the tetrahedra 16 of the invention, or it can be converted to the rolled forms 17 or 19 as shown in FIGS. 3 and 4 for shipment to a user. In either case, whether using the flattened tube stock directly or forming the tetrahedra from the rolled tube stock of FIGS. 3 or 4, a similar tool can be used to form the tetrahedra 16. The forming procedure consists of feeding the flat tube into position and causing one or more tools to act upon the stock to cut the tube and produce the end flaps F on each cut piece at a right angle to each other.

A tool for forming and cutting which crimps, holds, cuts and seams the tube stock, in one stroke is shown in somewhat simplified form in FIGS. 12-15. These figures show the cutting and seaming of flat tube stock 10B to produce a crimped strip at an angle of 90 degrees to the flat faces of the stock 10B as it is positioned for cutting, but it will be apparent that the same kind of tool can readily be used for cutting and forming a crimped strip in the same plane as that defined by the broad face of the stock 10B, i.e. at an angle of 90 degrees with respect to the strip forming process illustrated.

Figures 12, 13, 14, 15:
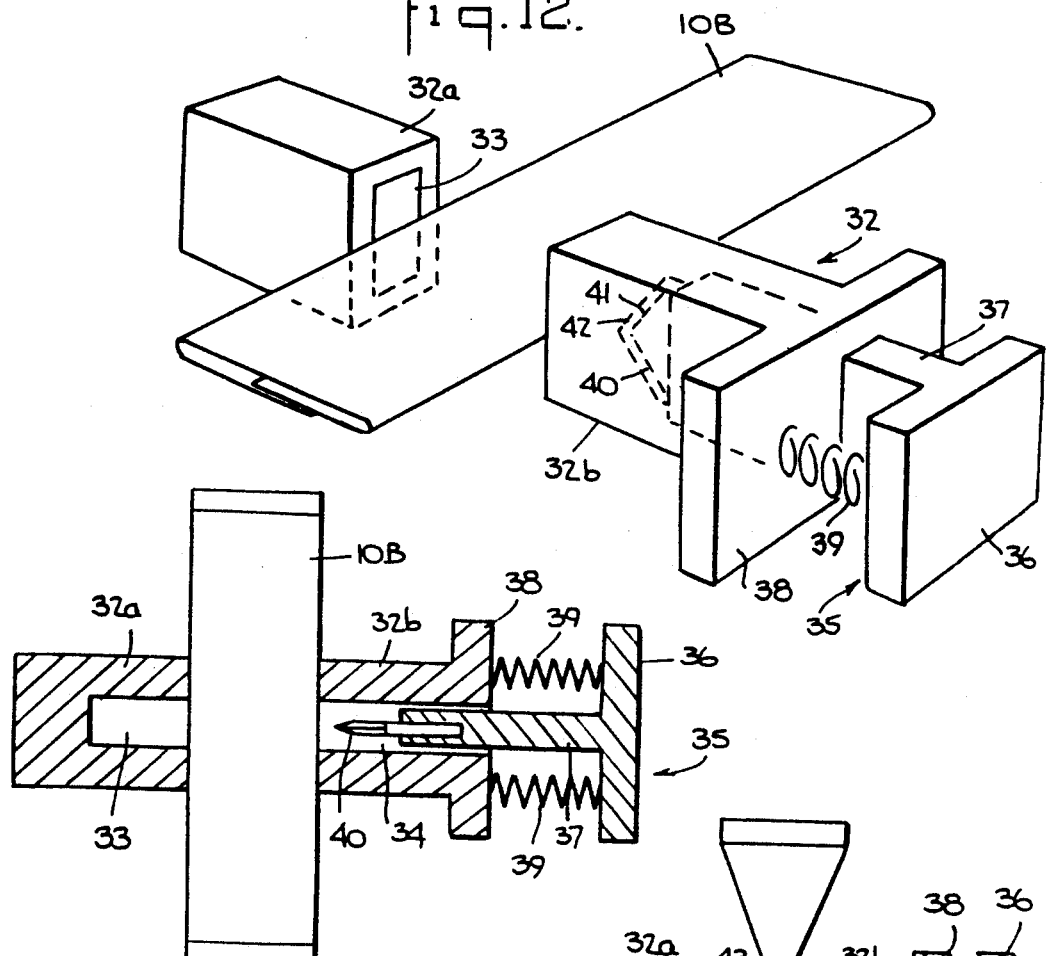
FIGS. 12-15 illustrate the steps of forming and cutting the tetrahedra from a flat tube and details of a machine for forming and cutting.

FIG. 12 shows the flat tube stock 10B positioned between opposed heads 32a and 32b of a cutting and forming tool generally designated 32. The heads 32a and 32b are positioned closely adjacent to the tube stock 10B, as can be seen in the several drawing figures, and the heads 32a and 32b are movable toward and away from each other.

The tool head 32 has a recess 33 which is generally rectangular in section, which recess 33 is in opposed position to a passage 34 through the head 33b. The passage 34 can be similar in section to the recess 33, as shown. A plunger 35 has a base 36 and a generally rectangular shaft 37 perpendicular to the base 36, which shaft 37 is received within the passage 34 for sliding, reciprocating motion with respect to the head 32b.

The head 32b has a base 38 extending perpendicularly to the lengthwise direction of the passage 34 and hence perpendicularly to the direction of movement of the shaft 37. Retract springs 39 (two shown) are mounted between the opposed bases 36 of the plunger 35 and 38 of the head 32b.

A knife 40 is carried by the end of the plunger shaft 37 remote from the plunger head 36 and within the passage 34. The knife 40 preferably has a generally triangular leading edge 41 with a central point 42 as shown in FIG. 12.

The forming tool 32 is shown in open condition in FIGS. 12 and 13, with the heads 32a and 32b spaced apart by a distance slightly greater than the width of the tube blank 10B which is positioned between the heads 32a and 32b. From the position of FIGS. 12 and 13 the heads 32a, 32b are moved toward each other to the closed tool position shown in FIG. 14. This closing of the tool crimps the tube 10B and forms a crimped strip oriented like the strip 15 of FIG. 1, that is, perpendicular to the flat surface of the tube stock 10B as the tube had lain before the crimping step.

Cutting of the material at the crimped strip formed in accordance with FIG. 14 is shown in FIG. 15. The heads 32a, 32b remain in the closed relationship of FIG. 14 and the shaft 37 and knife 40 are advanced by bringing the base 36 of the plunger 35 closer to the base 38 of the head 32b. This compresses the springs 39 as shown in FIG. 15. The point 42 of the knife first pierces the stock 10 and as the knife 40 is further advanced the portions of the knife edge 41 on both sides of the point 42 complete the cut, severing the stock 10 and forming the flaps F. Following the knife 40 to the position shown in FIG. 15 the forward end of the shaft 37 forces the severed ends of the material apart at both sides of the cut and bends a tab 43 on each of the severed material ends at the flap F, mechanically locking the material together at each of the opposed flaps F formed by the cutting stroke.

The knife 40 is then retracted and the tool heads 32a, 32b are returned to the open tool position of FIG. 12.

It will be understood that another tool like the tool 32, but arranged at a right angle to the tool 32, can be operated simultaneously or sequentially with respect to the operation of the tool 32, to form crimped strips like the strip 14 of FIG. 1, thus completing the space-enclosing tetrahedron. Multiple tools for cutting, crimping and forming can be employed simultaneously.

The machines used in the processes of the invention need not, as shown in the foregoing, be complex, and a user of the loose-fill material could make the tetrahedra at the user's facility, such as a packaging and/or shipping room.

A simplified process for forming a generally tetrahedral unit is shown in FIGS. 16-19. This simplified method results in a product which is generally similar in shape to the tetrahedron of FIG. 2, although it has no part corresponding to one of the end flaps F of the tetrahedron unit shown in FIG. 2, but has a simple fold line instead. It is believed that the product of the simplified forming process, shown in FIGS. 20-23 can be stronger and more stable in shape than that of FIG. 2, while having the same advantages inherent in the generally tetrahedral geometry. The material used to form the loose-fill units in accordance with the embodiment of FIGS. 16-23 can be the same as that of FIGS. 1-15, that is, flat stock such as re-cycled magazine pages, thin metal, plastic sheet or paper in a range of weights.

FIG. 16 schematically illustrates the cutting to the desired length of a strip 50 of flat stock material, which is longer than it is wide. Adhesive is shown on the upper surface of the strip 50 at three areas 51 near three corners of the strip 50.

FIG. 17 shows the first step of a three step folding sequence. As shown in FIG. 17, an end 52 of the strip 50 which is shown in FIG. 16 as having adhesive at an area 51 near only one corner, is folded upwards on both sides of a longitudinal center line of the strip 50 so that the opposite corners of the strip 50 are brought into contact with each other. The adhesive at the area 51 secures the corners of the strip end together. If desired there could be adhesive at both corners of this end 52 of the strip 50, as there are at the other strip end 53 as shown in FIG. 16, but that is not necessary to secure the corners together as shown in FIG. 17.

The end 53 of the strip 50 is shown having adhesive areas 51 near both of its corners. The next step of the folding sequence is to fold the strip 50 along a transverse line at the middle of its length as shown in FIG. 18 so that the end 53 is brought into contact with the joined corners of the strip end 52. This results in a fold line at 54 as shown.

The corners of the strip 50 at the end 53 are then brought toward each other and into contact with the outer sides of the folded end 52 as shown in FIG. 19. The adhesive at areas 51 secures the corners of the end 53 to the opposed corners of the end 52, forming the generally tetrahedral unit 56, which is generally similar in shape to the unit 16 of FIG. 2, although the unit 56 is somewhat more rounded in some of its contours than the unit 16, since the folds of the unit 56 need not be sharp creases.

Simply described, the alternative method involves pinching together the corners at one end 52, of the strip; folding the strip at its longitudinal middle; and pinching together the corners of the other strip end 53 about the previously pinched-together corners of the strip end 52.

The tetrahedral loose-fill packing unit 56 is shown in perspective in FIG. 20. It will be seen that openings 57 exist at the opposite ends of the edge formed by the fold line 54. Since the unit 56, like the unit 16, is not intended for use as a container for anything, there is no reason for the unit 56 to be sealed.

The area 58 where the folded ends 52 and 53 are joined has been described as held together by an adhesive, but the interconnection could be made by crimping the folded ends 52 and 53 together, employing no material other than the sheet stock which has environmental advantages in making recycling of the loose-fill material easier.

It will also be seen that as a result of the folding process by which the unit 56 is made the top of the unit at 59 is not a straight edge, since the ends 52 and 53 are disposed at an angel with respect to each other.

The units 16 and 56 can be made from the same sheet materials and have essentially the same tetrahedral shape, except that the unit 56 has only one area 58 corresponding to one of the two end flaps F of the unit 16. Neither the unit 16 nor the unit 56 has to be sealed, since they are not containers, and are empty except for air. The units 56 and 16 are formed of material which is sufficiently stiff that the units are self-supporting and retain their tetrahedral shape when employed in loose-fill packing, and if distorted by pressure, tend to return to their original shape.

What has been described is a novel and ecologically advantageous loose-fill materials and processes and apparatus for making such loose-fill. Numerous variations, applications and modifications of the presently preferred embodiments described will suggest themselves to those familiar with the art, and are considered to be within the spirit and scope of the invention.

What is claimed is:

1. Loose-fill packing material for cushioning an object packed for shipment, comprising a plurality of hollow, empty, unsealed, self-supporting tetrahedral units, wherein each loose-fill unit is integrally formed of rectangular sheet material with a transverse fold line at the middle of the longer dimension of the rectangular sheet constituting one edge of the tetrahedral unit; opposite end portions of the rectangular sheet material, each end portion being folded with one folded end portion held within the other folded end portion, forming a flap at another edge of the tetrahedral unit.

2. The loose-fill packing material of claim 1 wherein the folded end portions are held together by adhesive.

3. The loose-fill packing material of claim 1 wherein the folded end portions are crimped together.

4. The loose-fill packing material of claim 1 wherein the loose-fill units are formed primarily of paper.

5. The loose-fill packing material of claim 4 wherein the paper is recycled paper.

6. The loose-fill packing material of claim 1 wherein the loose-fill units of said plurality of units are substantially identical in size and shape.

7. The loose-fill packing material of claim 1 wherein the loose-fill units of said plurality of units ar so dimensioned that they cannot nest together to completely fill the volume bounded by a right rectangular prism.

* * * * *